(12) United States Patent
Kim

(10) Patent No.: US 11,409,444 B2
(45) Date of Patent: *Aug. 9, 2022

(54) MEMORY SYSTEM AND OPERATION METHOD THEREOF

(71) Applicant: SK hynix Inc., Gyeonggi-do (KR)

(72) Inventor: Ju Hyun Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/198,695

(22) Filed: Mar. 11, 2021

(65) Prior Publication Data

US 2022/0121375 A1 Apr. 21, 2022

(30) Foreign Application Priority Data

Oct. 15, 2020 (KR) ........................ 10-2020-0133467

(51) Int. Cl.
*G06F 3/06* (2006.01)
(52) U.S. Cl.
CPC ............ *G06F 3/0616* (2013.01); *G06F 3/064* (2013.01); *G06F 3/0679* (2013.01)
(58) Field of Classification Search
None
See application file for complete search history.

(56) References Cited

U.S. PATENT DOCUMENTS

| | | | | |
|---|---|---|---|---|
| 11,182,289 B1* | 11/2021 | Kang | ................ | G06F 12/0804 |
| 2015/0113305 A1* | 4/2015 | Shin | ..................... | G06F 3/0679 |
| | | | | 713/323 |
| 2020/0218455 A1* | 7/2020 | Cho | .................... | G06F 12/0873 |
| 2020/0218470 A1* | 7/2020 | Cho | ........................ | G06F 3/0659 |
| 2020/0249854 A1* | 8/2020 | Koo | ....................... | G06F 3/0679 |
| 2021/0240391 A1* | 8/2021 | Shin | ..................... | G06F 3/0679 |
| 2021/0294739 A1* | 9/2021 | Oh | .......................... | G06F 9/546 |
| 2021/0303176 A1* | 9/2021 | Shin | ...................... | G06F 3/0631 |
| 2021/0390044 A1* | 12/2021 | Kang | ................... | G06F 12/0804 |
| 2021/0397364 A1* | 12/2021 | Cho | ........................ | G06F 3/0655 |
| 2021/0397378 A1* | 12/2021 | Cho | ........................ | G06F 3/0659 |
| 2021/0397558 A1* | 12/2021 | Cho | .......................... | G06F 3/061 |
| 2022/0083274 A1* | 3/2022 | Cho | ........................ | G06F 3/064 |

FOREIGN PATENT DOCUMENTS

KR 10-2016-0150451 12/2016
KR 10-2017-0104111 9/2017

* cited by examiner

*Primary Examiner* — Kevin Verbrugge
(74) *Attorney, Agent, or Firm* — IP & T Group LLP

(57) ABSTRACT

A memory system includes: a controller including first and second cores; a plurality of channels connected to the controller; a plurality of first memory devices each including first memory blocks allocated to the first core, each of the plurality of channels being coupled to at least one first memory device; and a plurality of second memory devices each including second memory blocks allocated to the second core, each of the plurality of channels being coupled to at least one second memory device, wherein the controller further includes: a global wear leveling manager configured to perform a global wear leveling operation by swapping a first memory block and a second memory block, which are connected to the same channel among the first memory blocks and the second memory blocks, between the first and second cores on the basis of wear levels of the first memory blocks and the second memory blocks.

20 Claims, 7 Drawing Sheets

| ORIGINAL BLOCK ADDR | REMAPPED BLOCK ADDR |
|---|---|
| (DIE_A, CH_A, BLK_D) | (DIE_B, CH_A, BLK_C) |
| (DIE_A, CH_B, BLK_D) | (DIE_B, CH_B, BLK_C) |
| (DIE_A, CH_C, BLK_D) | (DIE_B, CH_C, BLK_C) |
| (DIE_A, CH_D, BLK_D) | (DIE_B, CH_D, BLK_C) |
| ... | ... |

SB1_D (left) — SB2_C (right)

| ORIGINAL BLOCK ADDR | REMAPPED BLOCK ADDR |
|---|---|
| (DIE_B, CH_A, BLK_C) | (DIE_A, CH_A, BLK_D) |
| (DIE_B, CH_B, BLK_C) | (DIE_A, CH_B, BLK_D) |
| (DIE_B, CH_C, BLK_C) | (DIE_A, CH_C, BLK_D) |
| (DIE_B, CH_D, BLK_C) | (DIE_A, CH_D, BLK_D) |
| ... | ... |

SB2_C (left) — SB1_D (right)

MEMORY SYSTEM AND OPERATION METHOD THEREOF

CROSS-REFERENCE TO RELATED APPLICATION

This application claims priority under 35 U.S.C. § 119 to Korean Patent Application No. 10-2020-0133467 filed on Oct. 15, 2020, which is incorporated herein by reference in its entirety.

BACKGROUND

1. Field

Various embodiments relate to a memory system including a memory device.

2. Discussion of the Related Art

The computer environment paradigm has been transitioning to ubiquitous computing, which enables computing systems to be used virtually anytime and anywhere. As a result, use of portable electronic devices such as mobile phones, digital cameras, and laptop computers has rapidly increased. These portable electronic devices generally use a memory system having one or more memory devices for storing data. A memory system may be used as a main memory device or an auxiliary memory device of a portable electronic device.

Since they have no moving parts, memory systems provide advantages such as excellent stability and durability, high information access speed, and low power consumption. Examples of memory systems having such advantages include universal serial bus (USB) memory devices, memory cards having various interfaces, and solid state drives (SSD).

SUMMARY

Various embodiments are directed to providing a memory system including a multicore capable of equalizing wear levels of memory blocks allocated to different multicores, and an operation method thereof.

Various embodiments are directed to providing a memory system capable of improving the performance of the memory system by allowing the memory system to be normally used until the end of the lives of all memory blocks included in the memory system, and an operation method thereof.

The technical problems to be achieved by the present embodiment are not limited to the technical problems described above, and other technical problems may be inferred from the following embodiments.

In accordance with an embodiment, a memory system includes: a controller including first and second cores; a plurality of channels connected to the controller; a plurality of first memory devices each including first memory blocks allocated to the first core, each of the plurality of channels being coupled to at least one first memory device; and a plurality of second memory devices each including second memory blocks allocated to the second core, each of the plurality of channels being coupled to at least one second memory device, wherein the controller further includes: a global wear leveling manager configured to perform a global wear leveling operation by swapping a first memory block and a second memory block, which are connected to substantially the same channel among the first memory blocks and the second memory blocks, between the first and second cores on the basis of wear levels of the first memory blocks and the second memory blocks.

The first core may access the first memory blocks in parallel by configuring first superblocks with the first memory blocks respectively connected to the plurality of channels, wherein the second core may access the second memory blocks in parallel by configuring second superblocks with the second memory blocks respectively connected to the plurality of channels, and wherein the global wear leveling manager may perform the global wear leveling operation on a channel by channel basis in order to swap the first and second superblocks between the first and second cores.

The global wear leveling manager may start the global wear leveling operation when a difference between a first average wear level of the first memory blocks and a second average wear level of the second memory blocks exceeds a first threshold value.

When the first average wear level is higher than the second average wear level, the global wear leveling manager may perform the global wear leveling operation by swapping a first free block, which is a free block with the lowest wear level among the first memory blocks, and a second free block which is a free block with the highest wear level among the second memory blocks.

The first and second cores may be further configured to determine the wear levels of the first memory blocks and the second memory blocks by performing erase counts of the first superblocks and the second superblocks, respectively, and wherein the global wear leveling manager may perform the global wear leveling operation by further swapping first memory blocks included in a free superblock with the lowest wear level among the first superblocks and second memory blocks included in a free superblock with the highest wear level among the second superblocks, on the channel by channel basis.

The global wear leveling manager may perform the global wear leveling operation by swapping information on the wear levels of the first and second free blocks and updates the first and second average wear levels.

The global wear leveling manager may repeatedly perform the global wear leveling operation until the difference between the first average wear level of the first memory blocks and the second average wear level of the second memory blocks is less than a second threshold value.

The global wear leveling manager may repeatedly perform the global wear leveling operation until first free blocks included in the first memory blocks or second free blocks included in the second memory blocks are all swapped.

The global wear leveling manager may repeatedly perform the global wear leveling operation until effective free blocks that reduce the difference between the first and second average wear levels among the first and second memory blocks are all swapped.

The first core may perform a local wear leveling operation on the first memory devices, and the second core may perform a local wear leveling operation on the second memory devices.

The first core may control the first memory devices to store data associated with first logical addresses, and the second core may control the second memory devices to store data associated with second logical addresses.

The memory system may further include: a host interface configured to classify logical addresses associated with commands from a host into the first logical addresses and the second logical addresses on the basis of a result of a hash function operation on the logical addresses, to provide the first core with a command associated with the first logical address, and to provide the second core with a command associated with the second logical address.

The first core may be further configured to store a remap table, which includes information on physical addresses of swapped first memory blocks and swapped second memory blocks, in a memory included in the controller, translate the first logical address into a physical address of the first memory block by referring to a logical to physical (L2P) map table, retranslate the translated physical address of the first memory block into a corresponding physical address of the second memory block when the translated physical address of the first memory block is included in the remap table, and access the second memory device on the basis of the retranslated physical address of the second memory block.

In accordance with an embodiment, an operation method of a memory system including a controller having first and second cores, a plurality of channels connected to the controller, and a plurality of memory blocks connected to each of the plurality of channels, the operation method includes: allocating first memory blocks of the plurality of memory blocks to the first core; allocating second memory blocks of the plurality of memory blocks to the second core; and performing a global wear leveling operation by swapping a first memory block and a second memory block, which are connected to the same channel among the first memory blocks and the second memory blocks, between the first and second cores on the basis of wear levels of the first memory blocks and the second memory blocks.

In accordance with an embodiment, a memory system includes: first memory blocks coupled to respective channels; second memory blocks coupled to the respective channels; a manager suitable for generating a remap table having mapping information between a selected first memory block among the first memory blocks and a selected second memory block among the second memory blocks, the selected first memory block and second memory block sharing one channel among the channels; and a core suitable for accessing the first memory blocks through the respective channels based on an address table having address information of the first memory blocks and suitable for accessing the selected second memory block through the shared channel based on the address table and the remap table.

In accordance with the present disclosure, it is possible to provide a memory system including a multicore, capable of equalizing wear levels of memory blocks allocated to different multicores, and an operation method thereof.

In accordance with the present disclosure, it is possible to provide a memory system, capable of improving the performance of the memory system by allowing the memory system to be normally used until the end of the lives of all memory blocks included in the memory system, and an operation method thereof.

Effects achievable in the present disclosure are not limited to the aforementioned effects and other unmentioned effects will be clearly understood by those skilled in the art to which the present disclosure pertains from the following description.

BRIEF DESCRIPTION OF THE DRAWINGS

FIG. 5A and FIG. 5B are diagrams for describing remap table in accordance with an embodiment of the present disclosure.

DETAILED DESCRIPTION

Hereinafter, various embodiments of the present disclosure will be described with reference to the accompanying drawings. However, the present disclosure is not limited to the embodiments disclosed below, but may be configured in various different forms. The present embodiments are provided to assist those skilled in the art to completely understand the scope of the present disclosure.

Figure 1:
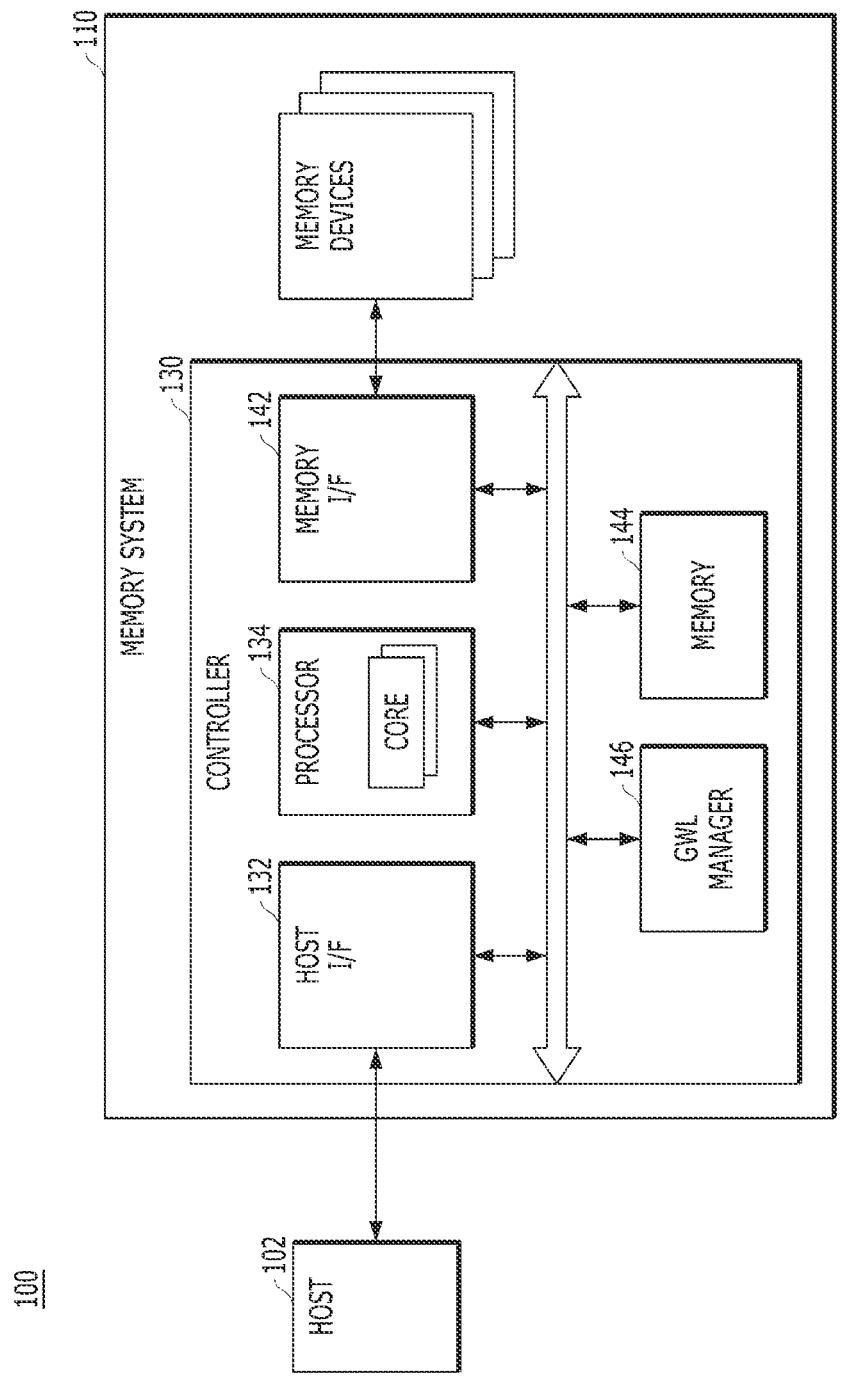
FIG. 1 is a diagram schematically illustrating a data processing system including a memory system in accordance with an embodiment of the present disclosure.

FIG. 1 is a block diagram illustrating a data processing system 100 in accordance with an embodiment of the present invention.

Referring to FIG. 1, the data processing system 100 may include a host 102 operatively coupled to a memory system 110.

The host 102 may include any of various portable electronic devices such as a mobile phone, MP3 player and laptop computer, or any of various non-portable electronic devices such as a desktop computer, a game machine, a television (TV), and a projector.

The host 102 may include at least one operating system (OS), which may manage and control overall functions and operations of the host 102, and provide operations between the host 102 and a user using the data processing system 100 or the memory system 110. The OS may support functions and operations corresponding to the use, purpose, and usage of a user. For example, the OS may be divided into a general OS and a mobile OS, depending on the mobility of the host 102. The general OS may be divided into a personal OS and an enterprise OS, depending on the environment of a user.

The memory system 110 may operate to store data for the host 102 in response to a request of the host 102. Non-limiting examples of the memory system 110 may include a solid state drive (SSD), a multi-media card (MMC), a secure digital (SD) card, a universal serial bus (USB) device, a universal flash storage (UFS) device, compact flash (CF) card, a smart media card (SMC), a personal computer memory card international association (PCMCIA) card and memory stick. The MMC may include an embedded MMC (eMMC), reduced size MMC (RS-MMC) and micro-MMC, and the like. The SD card may include a mini-SD card and micro-SD card.

The memory system 110 may be embodied by various types of storage devices. Examples of such storage devices may include, but are not limited to, volatile memory devices such as a dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM or ReRAM) and a flash memory. The flash memory may have a 3-dimensional (3D) stack structure.

The memory system 110 may include a controller 130 and a plurality of memory devices. The plurality of memory devices may store data for the host 102, and the controller 130 may control data storage into the plurality of memory devices.

The controller 130 and the plurality of memory devices may be integrated into a single semiconductor device. For example, the controller 130 and the plurality of memory devices may be integrated into one semiconductor device to constitute a solid state drive (SSD). When the memory system 110 is used as an SSD, the operating speed of the host 102 connected to the memory system 110 can be improved. In addition, the controller 130 and the plurality of memory devices may be integrated into one semiconductor device to constitute a memory card. For example, the controller 130 and the plurality of memory devices may constitute a memory card such as a personal computer memory card international association (PCMCIA) card, compact flash (CF) card, smart media (SM) card, memory stick, multimedia card (MMC) including reduced size MMC (RS-MMC) and micro-MMC, secure digital (SD) card including mini-SD card, micro-SD card and SDHC card, or universal flash storage (UFS) device.

Non-limiting application examples of the memory system 110 may include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The plurality of memory devices may be a nonvolatile memory device and may retain data stored therein even though power is not supplied. The plurality of memory devices may store data provided from the host 102 through a program operation, and provide data stored therein to the host 102 through a read operation. In an embodiment, the plurality of memory devices may be a flash memory. The flash memory may have a 3-dimensional (3D) stack structure.

The controller 130 may control the plurality of memory devices in response to a request from the host 102. For example, the controller 130 may provide data read from the plurality of memory devices to the host 102, and store data provided from the host 102 into the plurality of memory devices. For these operations, the controller 130 may control read, program and erase operations of the plurality of memory devices.

The controller 130 may include a host interface (I/F) 132, a processor 134, a memory I/F 142, a memory 144 and a global wear-leveling (GWL) manager 146 all operatively coupled via an internal bus.

The host I/F 132 may be configured to process a command and data of the host 102, and may communicate with the host 102 through one or more of various interface protocols such as universal serial bus (USB), multi-media card (MMC), peripheral component interconnect-express (PCI-e or PCIe), small computer system interface (SCSI), serial-attached SCSI (SAS), serial advanced technology attachment (SATA), parallel advanced technology attachment (DATA), enhanced small disk interface (ESDI) and integrated drive electronics (IDE).

The host I/F 132 may be driven through firmware referred to as a host interface layer (HIL) in order to exchange data with the host.

The memory I/F 142 may serve as a memory/storage interface for interfacing the controller 130 and the plurality of memory devices such that the controller 130 controls the plurality of memory devices in response to a request from the host 102. When the plurality of memory devices is a flash memory or specifically a NAND flash memory, the memory I/F 142 may generate a control signal for the plurality of memory devices and process data to be provided to the plurality of memory devices under the control of the processor 134. The memory I/F 142 may work as an interface (e.g., a NAND flash interface) for processing a command and data between the controller 130 and the plurality of memory devices. Specifically, the memory I/F 142 may support data transfer between the controller 130 and the plurality of memory devices.

The memory I/F 142 may be driven through firmware referred to as a flash interface layer (FIL) in order to exchange data with the plurality of memory devices.

The memory 144 may serve as a working memory of the memory system 110 and the controller 130, and store data for driving the memory system 110 and the controller 130. The controller 130 may control the plurality of memory devices to perform read, program and erase operations in response to a request from the host 102. The controller 130 may provide data read from the plurality of memory devices to the host 102, may store data provided from the host 102 into the plurality of memory devices. The memory 144 may store data required for the controller 130 and the plurality of memory devices to perform these operations.

The memory 144 may be embodied by a volatile memory. For example, the memory 144 may be embodied by static random access memory (SRAM) or dynamic random access memory (DRAM). The memory 144 may be disposed within or out of the controller 130. FIG. 1 exemplifies the memory 144 disposed within the controller 130. In an embodiment, the memory 144 may be embodied by an external volatile memory having a memory interface transferring data between the memory 144 and the controller 130.

As described above, the memory 144 may store data required for performing a data write/read operation between the host and the plurality of memory devices, and may store data when the data write/read operation is performed. In order to store such data, the memory 144 may include a program memory, data memory, write buffer/cache, read buffer/cache, data buffer/cache, map buffer/cache or the like.

The processor 134 may control the overall operations of the memory system 110. The processor 134 may drive firmware to control the overall operations of the memory system 110. The firmware may be referred to as flash translation layer (FTL). Also, the processor 134 may be realized as a microprocessor or a central processing unit (CPU). Particularly, to improve the data processing performance of the memory system 110, the processor 134 may be implemented as a multicore processor including a plurality of cores.

The processor 134 may drive the FTL and perform a foreground operation corresponding to a request received from the host. For example, the processor 134 may control a write operation of the plurality of memory devices in response to a write request from the host and control a read operation of the plurality of memory devices in response to a read request from the host. For example, the processor 134 may perform address mapping between logical addresses used in a file system of the host 102 and physical addresses used in the plurality of memory devices.

The controller 130 may perform a background operation onto the plurality of memory devices through the processor 134, which is realized as a microprocessor or a CPU. For example, the background operation performed onto the plurality of memory devices may include a garbage collection (GC) operation, a wear-leveling (WL) operation, a map flush operation, or a bad block management operation.

The processor 134 may execute firmware called a flash translation layer (FTL) in order to perform the foreground operation and the background operation.

The plurality of cores included in the processor 134 may improve the performance of the memory system 110 while operating in parallel with each other. When the plurality of cores control memory devices allocated thereto in response to commands for different logical addresses, the plurality of cores may operate independently. Accordingly, the parallel processing performance of the plurality of cores may be maximized.

Each of the plurality of cores may perform a wear leveling operation in order to equalize the wear levels of the memory devices. For example, each of the plurality of cores may perform a local wear leveling operation of controlling a memory block, which is less worn out than other memory blocks included in the memory device allocated thereto, to be preferentially used.

The workloads of the plurality of cores may be different according to logical addresses received from the host 102 together with commands. If only the local wear leveling operation is performed in the memory system 110, then it is difficult to equalize wear levels among memory devices allocated to different cores when the workloads of the plurality of cores are different.

In accordance with an embodiment of the present disclosure, the GWL manager 146 may perform a global wear leveling operation for equalizing wear levels of memory devices allocated to different cores. The global wear leveling operation in accordance with an embodiment of the present disclosure will be described in detail below.

First, exclusive allocation between a plurality of cores and a plurality of memory dies will be described in detail with reference to FIG. 2 and FIG. 3.

Figure 2:
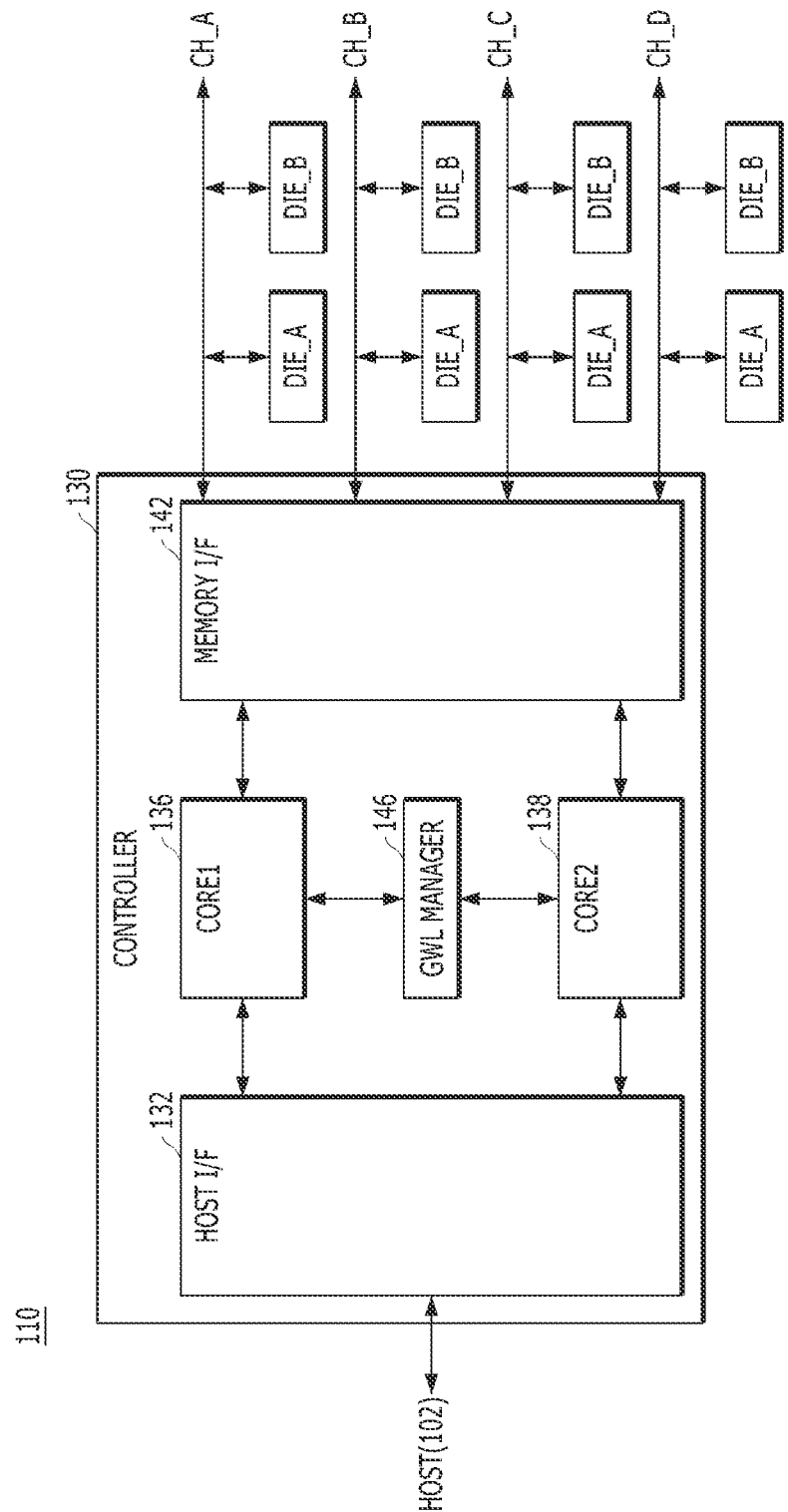
FIG. 2 is a detailed block diagram of the memory system illustrated in FIG. 1.

FIG. 2 is a detailed block diagram of the memory system 110 illustrated in FIG. 1.

The plurality of memory devices described with reference to FIG. 1 may correspond to a plurality of memory dies DIE_A and DIE_B illustrated in FIG. 2. The plurality of memory dies may be connected to the memory I/F 142 through a plurality of channels CH_A to CH_D.

The controller 130 with reference to FIG. 1 may correspond to a controller 130 illustrated in FIG. 2. Some of the components of the controller 130 described with reference to FIG. 1 are omitted from FIG. 2. A first core 136 and a second core 138 illustrated in FIG. 2 may correspond to the plurality of cores included in the processor 134 FIG. 1. The first core 136 and the second core 138 may operate independently.

The first core 136 and the second core 138 may operate in parallel and the plurality of dies may also operate in parallel.

The first core 136 and the second core 138 may process commands associated with different logical addresses.

The host I/F 132 may classify logical addresses associated with commands from the host 102 into odd logical addresses and even logical addresses. As a result of classifying the logical addresses, the host I/F 132 may provide the first core 136 with commands associated with the odd logical addresses and provide the second core 138 with commands associated with the even logical addresses. Accordingly, the first core 136 may process only the commands associated with the odd logical addresses and the second core 138 may process only the commands associated with the even logical addresses. Hereinafter, the commands associated with the odd logical addresses are referred to as odd address commands and the commands associated a with the even logical addresses are referred to as even address commands.

An embodiment of the present disclosure will be described using an example in which two cores process even address commands and odd address commands, respectively; however, the present disclosure is not limited thereto. The processor 134 may include two or more cores. On the basis of a result obtained by performing a hash function operation on the logical address associated with the command from the host 102, the host I/F 132 may provide the command to any one of the cores. The hash function may be an evenly distributed hash function capable of evenly distributing logical addresses to each core. For example, on the basis of a result obtained by calculating the logical address modulo the number of cores, the host I/F 132 may provide the command to any one of the cores.

Some of the plurality of dies may be allocated to the first core 136 and the rest may be allocated to the second core 138. The first core 136 may control the memory dies allocated thereto in order to process odd address commands, and the second core 138 may control the memory dies allocated thereto in order to process even address commands.

Since the logical addresses and the memory dies allocated to the first core 136 and the second core 138 are different, the first core 136 and the second core 138 may access the memory dies by referring to separate logical to physical (L2P) map tables. For example, the memory 144 may store a first L2P map table including mapping information between odd logical addresses and physical addresses of the memory dies allocated to the first core 136. Furthermore, the memory 144 may store a second L2P map table including mapping information between even logical addresses and physical addresses of the memory dies allocated to the second core 138.

Each of the first core 136 and the second core 138 may perform a separate local wear leveling operation in order to equalize the wear levels of the memory dies allocated thereto.

If memory dies connected to the channel A CH_A and the channel B CH_B are allocated to the first core 136 and memory dies connected to the channel C CH_C and the channel D CH_D are allocated to the second core 138, it is difficult to equalize wear levels of the memory dies connected to different channels. For example, when the memory dies allocated to the first core 136 reach their end of life first, even though the lives of the memory dies allocated to the second core 138 remain, it is not possible to normally use the memory system 110.

In order to equalize wear levels of memory dies allocated to different channels, a method of swapping logical addresses associated with the first core 136 and the second core 138 may also be considered. However, in order to swap the logical addresses, it is necessary to swap data associated with the logical addresses together between the memory dies allocated to the first core 136 and the memory dies allocated to the second core 138. When swapping the logical addresses and the data together between the first core 136 and the second core 138, it is difficult to guarantee atomicity, consistency, isolation, durability (ACID) properties of transactions between the first core 136 and the second core 138 of the memory system 110.

In accordance with an embodiment of the present disclosure, each of all the channels CH_A to CH_D may be connected to a plurality of memory dies. In the example of FIG. 2, each channel may be connected to two memory dies, and the two memory dies are identified as the die A DIE_A and the die B DIE_B.

Among the memory dies DIE_A and DIE_B coupled to the respective channels CH_A to CH_D, first memory dies may be allocated to the first core 136 and second memory dies may be allocated to the second core 138. In the example of FIG. 2, the dies A DIE_A or the first memory dies of all the channels CH_A to CH_D may be allocated to the first core 136 and the dies B DIE_B or the second memory dies of all the channels CH_A to CH_D may be allocated to the second core 138.

The first core 136 may control the dies A DIE_A through the channels A to D CH_A to CH_D, and the second core 138 may control the dies B DIE_B through the channels A to D CH_A to CH_D.

Memory blocks included in the first memory dies DIE_A and accessed by the first core 136 are referred to as first memory blocks, and memory blocks included in the second memory dies DIE_B and accessed by the second core 138 are referred to as second memory blocks.

The first core 136 may perform a local wear leveling operation in order to equalize the wear levels of the first memory blocks. The second core 138 may perform a local wear leveling operation in order to equalize the wear levels of the second memory blocks. In accordance with an embodiment, the first core 136 may perform a local wear leveling operation between memory blocks connected to the same channel among the first memory blocks, and the second core 138 may perform a local wear leveling operation between memory blocks connected to the same channel among the second memory blocks.

In accordance with an embodiment of the present disclosure, the GWL manager 146 may perform a global wear leveling operation for swapping first and second memory blocks between the first core 136 and the second core 138 on the basis of a difference between wear levels of the first memory blocks and the second memory blocks. For example, the GWL manager 146 may swap the first memory block and the second memory block, which are connected to the same channel, between the first core 136 and the second core 138. The GWL manager 146 swaps the first and second memory blocks of the same channel between the first core 136 and the second core 138 so that it is possible to equalize the wear levels of the first memory blocks and the second memory blocks.

The GWL manager 146 may be implemented in hardware or software. For example, when the GWL manager 146 is implemented in hardware, the GWL manager 146 may be implemented as a core separate from the first core 136 and the second core 138 and included in the processor 134. When the GWL manager 146 is implemented in firmware or software, the GWL manager 146 may be loaded into the memory 144 and may operate on the first core 136 or the second core 138.

Figure 3:
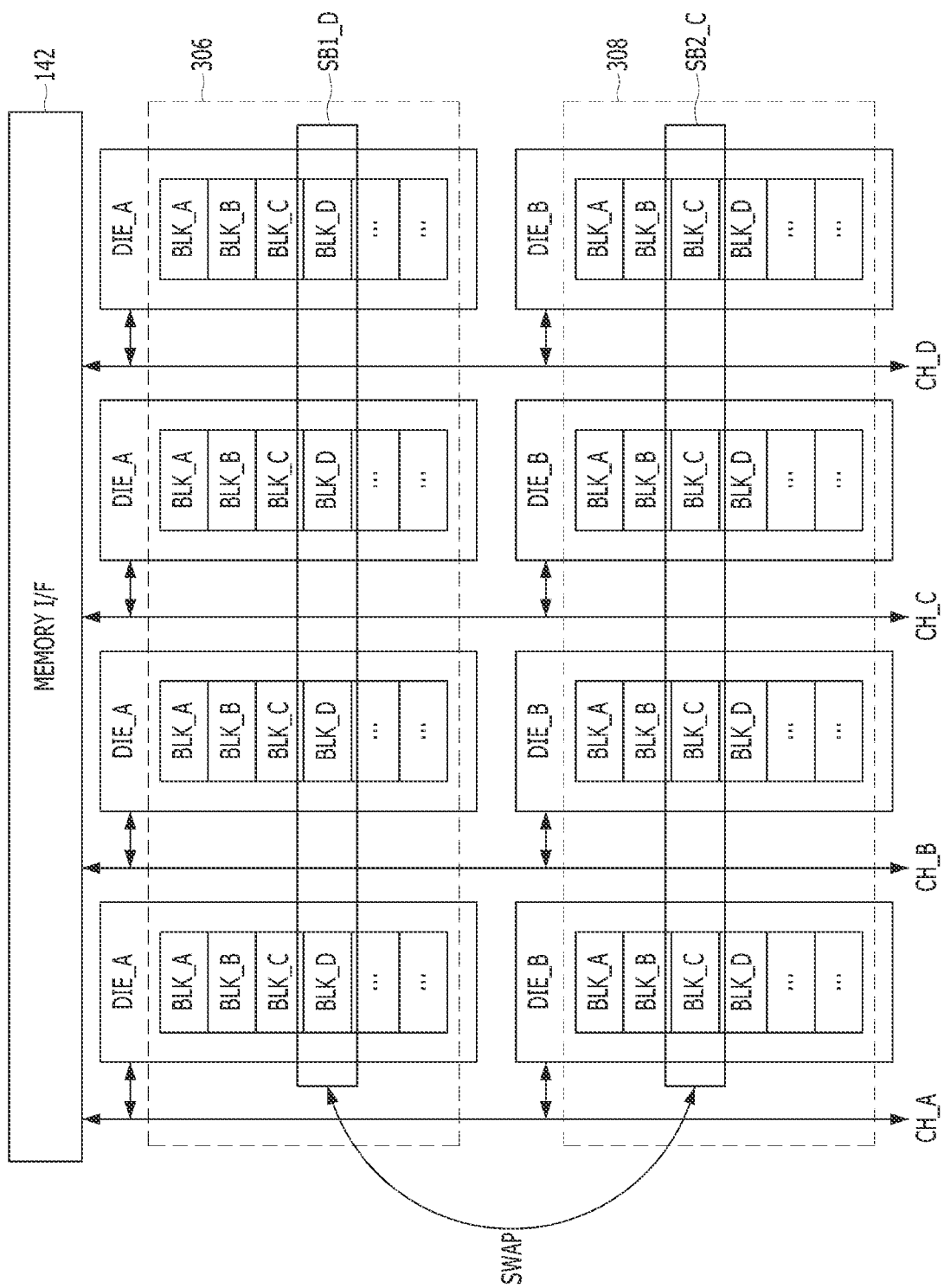
FIG. 3 is a diagram for describing a plurality of memory devices in accordance with an embodiment of the present disclosure.

FIG. 3 is a diagram for describing the plurality of memory devices in accordance with an embodiment of the present disclosure.

FIG. 3 illustrates the channels A to D CH_A to CH_D connected to the memory I/F 142 and the dies A DIE_A and the dies B DIE_B connected to the channels A to D CH_A to CH_D, respectively. The memory I/F 142, the channels A to D CH_A to CH_D, the dies A DIE_A, and the dies B DIE_B illustrated in FIG. 3 correspond to those described with reference to FIG. 2.

Each of the dies A DIE_A and the dies B DIE_B may operate independently. Each of the dies A DIE_A and the dies B DIE_B may have a hierarchical structure of a memory die, a memory block, and a page. One memory die may receive one command at a time through a channel. One memory die may include a plurality of memory blocks BLK_A, BLK_B, BLK_C, and BLK_D. An erase operation may be performed on a memory block basis. One memory block may include a plurality of pages. A program operation or a read operation may be performed on a page basis.

The dies A DIE_A may be allocated to the first core 136 and the dies B DIE_B may be allocated to the second core 138. In the example of FIG. 3, memory blocks included in the dies A DIE_A may be referred to as first memory blocks and memory blocks included in the dies B DIE_B may be referred to as second memory blocks. FIG. 3 illustrates a first memory block group 306 and a second memory block group 308.

In accordance with an embodiment of the present disclosure, the first core 136 and the second core 138 may configure a superblock with memory blocks, which are accessible in parallel, in order to improve parallel processing performance of memory dies. For example, the first core 136 may configure a first superblock by grouping first memory blocks included in the respective dies A DIE_A coupled to the respective channels CH_A to CH_D. FIG. 3 illustrates a first superblock SB1_D composed of the memory blocks D BLK_D, which are memory blocks having the same offset among the first memory blocks included in the dies A DIE_A coupled to the respective channels CH_A to CH_D. Also, the second core 138 may configure a second superblock by grouping second memory blocks included in the respective dies B DIE_B coupled to the respective channels CH_A to CH_D, in the same manner as the first core 136. FIG. 3 illustrates a second superblock SB2_C composed of the memory blocks C BLK_C, which are memory blocks having the same offset among the second memory blocks included in the dies B DIE_B coupled to the respective channels CH_A to CH_D.

One superblock may be composed of a plurality of stripes, One stripe may include a plurality of pages. For example, pages having the same offset in the plurality of memory blocks included in the first superblock may constitute the stripe. The first core 136 and the second core 138 may store data in the superblocks in units of stripes, or read data in units of stripes.

In accordance with an embodiment of the present disclosure, the GWL manager 146 may swap the first superblock and the second superblock between the first core 136 and the second core 138 according to a difference between average wear levels of the first memory block group 306 and the second memory block group 308. The GWL manager 146 may change the allocation of the first superblock from the first core 136 to the second core 138 and may change the allocation of the second superblock from the second core 138 to the first core 136, thereby swapping the first and second superblocks between the first core 136 and the second core 138.

The operation of swapping the allocated superblocks between the first core 136 and the second core 138 may include an operation of swapping each memory block included in the respective superblocks. When swapping the first memory blocks included in the first superblock and the second memory blocks included in the second superblock between the first core 136 and the second core 138, the GWL manager 146 may swap the first memory block and the second memory block, which are connected to the same channel.

The global wear leveling operation in accordance with an embodiment of the present disclosure will be described in detail with reference to FIG. 4, FIG. 5A, FIG. 5B, and FIG. 6.

Figure 4:
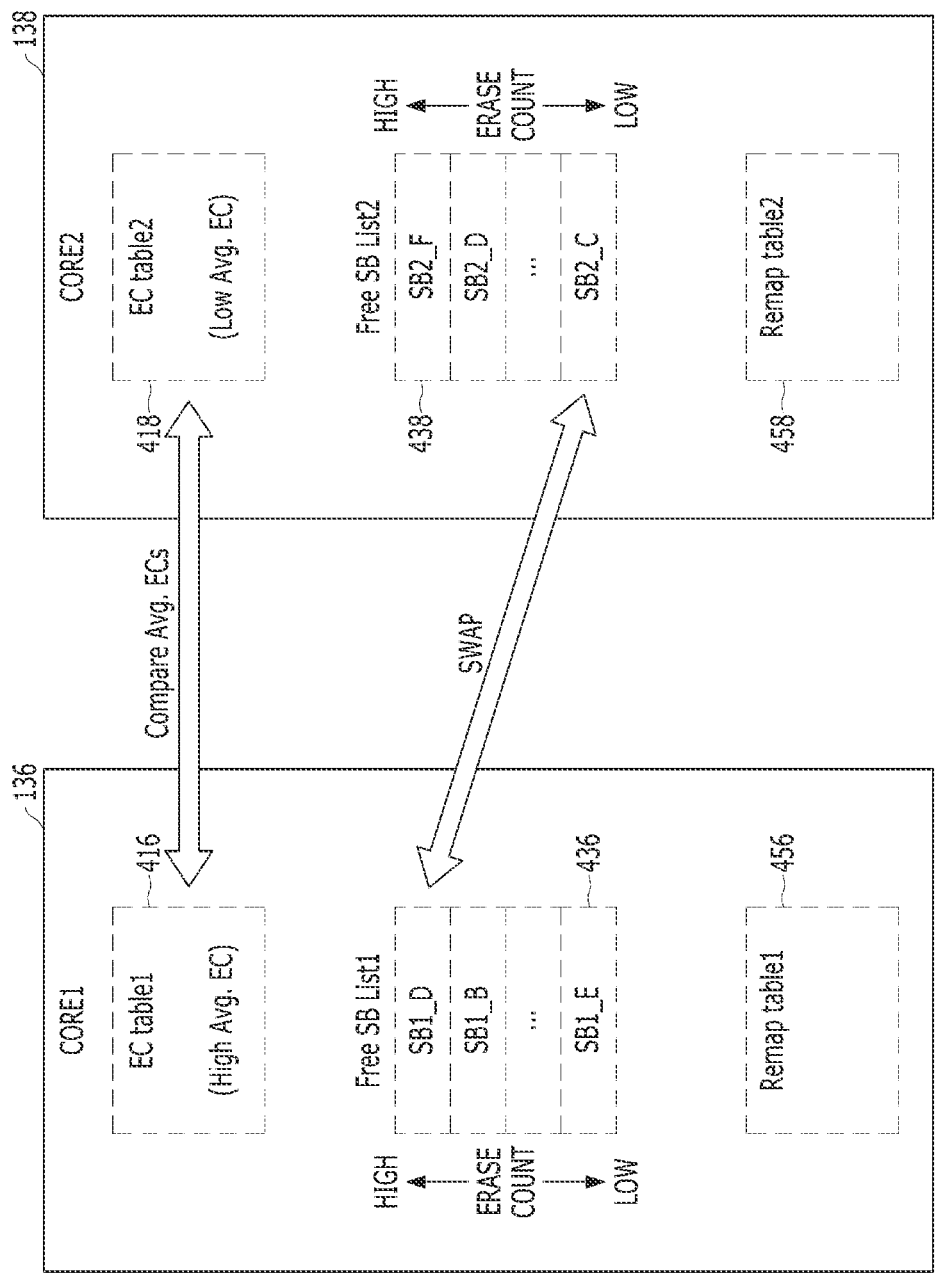
FIG. 4 is a diagram schematically illustrating first and second cores.

FIG. 4 schematically illustrates the first core 136 and the second core 138. A first erase count (EC) table 416, a first free superblock (SB) list 436, and a first remap table 456 indicated by broken lines in the first core 136 indicate data that may be stored in the memory 144 in relation to the first core 136. Similarly, a second EC table 418, a second free SB list 438, and a second remap table 458 indicated by broken lines in the second core 138 indicate data that may be stored in the memory 144 in relation to the second core 138.

The first EC table 416 may store erase counts of the first memory blocks allocated to the first core 136. In accordance with implementations, when the first memory blocks constitute the first superblock, the erase counts of the respective memory blocks constituting the first superblock may be the same. Accordingly, the first EC table 416 may store the erase counts of the first memory blocks or may store the erase counts of the first superblocks. Similarly, the second EC table 418 may store the erase counts of the second memory blocks or may store the erase counts of the second superblocks.

The GWL manager 146 may compare the wear levels of the first memory blocks and the second memory blocks in order to start the global wear leveling operation. For example, the GWL manager 146 may compare average erase counts of the first memory blocks and the second memory blocks by referring to the first EC table 416 and the second EC table 418. The average erase count of the first memory blocks and the average erase count of the second memory blocks may be referred to as a first average erase count and a second average erase count, respectively.

FIG. 4 illustrates a case where the first average erase count is higher than the second average erase count. The higher first average erase count may indicate that the first memory blocks have been worn more than the second memory blocks on average and the first core 136 processes more requests than the second core 138.

When a difference between the first and second average erase counts exceeds a threshold value, the GWL manager 146 may trigger the global wear leveling operation. FIG. 4 illustrates a case where the first average erase count is higher than the second average erase count when the global wear leveling operation has been started.

When the global wear leveling operation is started, the GWL manager 146 may determine the first superblock and the second superblock to be swapped between the first core 136 and the second core 138 by referring to the first free SB list 436 and the second free SB list 438.

Each of the first free SB list 436 and the second free SB list 438 may include information on free superblocks among the first and second superblocks. For example, the free superblock refers to a superblock in which all memory blocks have been erased. FIG. 4 illustrates that identifiers of free superblocks are arranged in an order of erase counts of the free superblocks in the first free SB list 436 and the second free SB list 438.

FIG. 4 illustrates the first free SB list 436 and the second free SB list 438 including the information on the free superblocks; however, the present disclosure is not limited to the fact that the first core 136 and the second core 138 determine for each superblock whether all memory cells are in an erased state. For example, the first core 136 and the second core 138 may determine on a memory block basis whether all memory cells are in an erased state, and may store the first free SB list 436 and the second free SB list 438 in the memory 144.

The GWL manager 146 may determine superblocks to be swapped such that a difference between the average erase counts of memory blocks allocated to the first core 136 and memory blocks allocated to the second core 138 may be reduced. For example, the GWL manager 146 may determine to swap a superblock with the highest erase count among free superblocks allocated to the first core 136 and a superblock with the lowest erase count among free superblocks allocated to the second core 138. FIG. 4 illustrates the swapping of the free superblock SB1_D allocated to the first core 136 and the free superblock SB2_C allocated to the second core 138.

When the superblock SB2_C with the lowest erase count is allocated to the first core 136 which processes relatively more requests, the superblock SB2_C may be accessed more frequently than before being allocated to the first core 136. When the superblock SB1_D with the highest erase count is allocated to the second core 138 which processes relatively fewer requests, the superblock SB1_D may be accessed less frequently than before being allocated to the second core 138. Accordingly, it is possible to equalize the wear levels of the first superblocks and the second superblocks.

In accordance with an embodiment of the present disclosure, the GWL manager 146 performs the global wear leveling operation by swapping free superblocks, in which no data is stored, between the first core 136 and the second core 138, and thus data may not be moved in the global wear leveling operation. Accordingly, it is possible to guarantee the ACID properties of transactions of the first core 136 and the second core 138.

The GWL manager 146 may swap superblocks allocated between the first core 136 and the second core 138, and swap erase counts corresponding to the swapped superblocks between the first EC table 416 and the second EC table 418. In the example of FIG. 4, the GWL manager 146 may store an erase count of the superblock SB1_D in the second EC table 418 as an erase count of the superblock SB2_C. Similarly, the GWL manager 146 may store the erase count of the superblock SB2_C in the first EC table 416 as the erase count of the superblock SB1_D. When the erase counts are swapped, the first and second average erase counts may also be updated. For example, as the first average erase count decreases and the second average erase count increases, a difference between the first and second average erase counts may decrease.

The GWL manager 146 may update the first remap table 456 and the second remap table 458 of the first core 136 and the second core 138, thereby swapping superblocks between the first core 136 and the second core 138. The first remap table 456 and the second remap table 458 may include mapping relationship information between the swapped superblocks. For example, when the superblock SB1_D and the superblock SB2_C are swapped, each of the first remap table 456 and the second remap table 458 may include mapping information between the superblock SB1_D and the superblock SB2_C. The first core 136 may access the superblock SB2_C, instead of the superblock SB1_D, by referring to the first remap table 456.

An example of the remap table in accordance with an embodiment of the present disclosure will be described with reference to FIG. 5A and FIG. 5B.

FIG. 5A illustrates the first remap table 456 associated with the first core 136.

The first remap table 456 indicates a mapping relationship between original block addresses and remapped block addresses of the first core 136. The original block addresses of the first remap table 456 indicate addresses of the memory blocks allocated to the first core 136 before memory block swapping is performed. Furthermore, the remapped block addresses of the first remap table 456 indicate addresses of the memory blocks that have been allocated to the second core 138 before memory block swapping is performed but allocated to the first core 136 after the memory block swapping is performed.

FIG. 5A illustrates the first remap table 456 when the superblock SB1_D and the superblock SB2_C illustrated in FIG. 4 have been swapped. Since the superblock SB1_D is a superblock allocated to the first core 136 before memory block swapping is performed, addresses of the memory blocks included in the superblock SB1_D may be included in the original block addresses. Since the superblock SB2_C is a superblock allocated to the first core 136 after the memory block swapping is performed, addresses of the memory blocks included in the superblock SB2_C may be included in the remapped block addresses.

FIG. 5A illustrates the original block addresses and the remapped block addresses stored in the first remap table 456 when the superblock SB1_D is composed of the blocks D BLK_D having the same offset in the dies A DIE_A of all the channels CH_A to CH_D and the superblock SB2_C is composed of the blocks C BLK_C having the same offset in the dies B DIE_B of all the channels CH_A to CH_D.

The original block addresses and the remapped block addresses may include memory die identifiers, channel identifiers, and memory block identifiers, respectively. When swapping the superblock SB1_D and the superblock SB2_C, the GWL manager 146 may swap a memory block included in the superblock SB1_D and a memory block included in the superblock SB2_C, which are included in the same channel. That is, the channel identifiers of the original block addresses and the remapped block addresses may be the same. Accordingly, the channel identifiers may be omitted from the remapped block addresses of the first remap table 456.

FIG. 5B illustrates the second remap table 458 associated with the second core 138.

The second remap table 458 indicates a mapping relationship between original block addresses and remapped block addresses of the second core 138. The original block addresses of the second remap table 458 indicate addresses of the memory blocks allocated to the second core 138 before memory block swapping is performed. Furthermore, the remapped block addresses indicate addresses of the memory blocks allocated to the second core 138 after the memory block swapping is performed.

FIG. 5B illustrates the second remap table 458 when the superblock SB1_D and the superblock 562_C illustrated in FIG. 4 have been swapped.

The second remap table 458 may include addresses of the memory blocks included in the superblock 562_C as the original block addresses, and include addresses of the memory blocks included in the superblock SB1_D as the remapped block addresses. Similar to the first remap table 456 described with reference to FIG. 5A, the original block addresses may include memory die identifiers, channel identifiers, and memory block identifiers. Furthermore, the remapped block addresses may include memory die identifiers and memory block identifiers, and channel identifiers may be omitted from the remapped block addresses.

Figure 6:
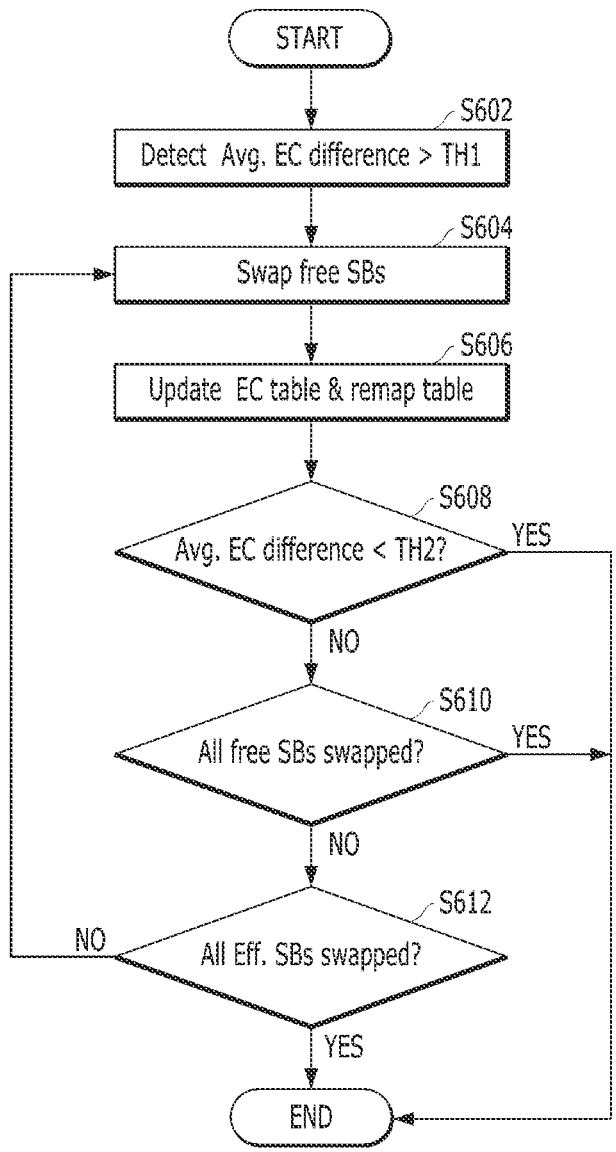
FIG. 6 is a flowchart illustrating a global wear leveling operation of the memory system in accordance with an embodiment of the present disclosure.

FIG. 6 is a flowchart illustrating the global wear leveling operation of the memory system 110 in accordance with an embodiment of the present disclosure.

In operation S602, the GWL manager 146 may start the global wear leveling operation when it is detected that a difference of average erase counts (EC) between the average erase counts of the first core 136 and the second core 138 exceeds a first threshold value TH1. The GWL manager 146 may determine the difference of average EC between the average erase counts of the first core 136 and the second core 138 by referring to the first EC table 416 and the second EC table 418 as described with reference to FIG. 4.

The present disclosure has been described using a case, where two cores are included in the processor 134, as an example; however, the present disclosure is not limited thereto. When more than two cores are included in the processor 134, the GWL manager 146 may start the global wear leveling operation when it is detected that a difference between a maximum value and a minimum value among the average erase counts of each core exceeds the first threshold value TH1.

In operation S604, the GWL manager 146 may determine superblocks to be swapped among the free superblocks SBs allocated to the first core 136 and the free superblocks SBs allocated to the second core 138. For example, the GWL manager 146 may determine the superblocks to be swapped by referring to the first free SB list 436 and the second free SB list 438 as described with reference to FIG. 4.

In operation S606, the GWL manager 146 may swap erase counts corresponding to the swapped superblocks of the first EC table 416 and the second EC table 418. Then, the GWL manager 146 may update the first remap table 456 and the second remap table 458 each indicating the mapping relationship of the swapped superblocks.

The GWL manager 146 may end or repeatedly perform the global wear leveling operation according to whether the conditions of operation S608, operation S610, and operation S612 are satisfied.

In operation S608, the GWL manager 146 may determine that the difference of average EC between the average erase counts of the memory blocks allocated to the first core 136 and the second core 138 is less than a second threshold value TH2. When the difference of average EC between the average erase counts is less than the second threshold value TH2 ("YES" in operation S608), the GWL manager 146 may end the global wear leveling operation.

When the difference of average EC between the average erase counts is greater than the second threshold value TH2 ("NO" in operation S608), the GWL manager 146 may determine in operation S610 whether all free superblocks free SBs currently allocated to the first core 136 or all free superblocks free SBs currently allocated to the second core 138 have been swapped. When all the free superblocks have been swapped ("YES" in operation S610), the GWL manager 146 may end the global wear leveling operation. For example, when the first free SB list 436 includes three free superblocks and the second free SB list 438 includes five free superblocks, the GWL manager 146 may end the global wear leveling operation after the three free superblocks are swapped.

When all the free superblocks have not been swapped ("NO" in operation S610), the GWL manager 146 may determine in operation S612 whether all effective superblocks have been swapped. The effective superblock refers to a free superblock capable of reducing a difference between the first and second average erase counts among the free superblocks.

In the example of FIG. 4, in a case where the erase count of the superblock SB1_D with the highest erase count in the first free SB list 436 is "200" and the erase count of the superblock SB2_C with the lowest erase count in the second free SB list 438 is "100", when the superblock SB1_D and the superblock SB2_C are swapped for each other, the first average erase count decreases and the second average erase count increases, accordingly, a difference between the first and second average erase counts may decrease. In such a case, the superblock SB1_D and the superblock SB2_C may be referred to as effective free superblocks.

On the other hand, in a case where the erase count of the superblock SB1_D is "100" and the erase count of the superblock SB2_C is "200", when the superblock SB1_D and the superblock SB2_C are swapped for each other, the difference between the first and second average erase counts may increase. The erase counts of all the free superblocks of the first free SB list 436 may be equal to or less than "100" and the erase counts of all the free superblocks of the second free SB list 438 may be equal to or greater than "200". In such a case, even though free superblocks are swapped, the difference between the first and second average erase counts may increase, and thus there are no effective free superblocks.

When all the effective superblocks have been swapped ("YES" in operation S612), the GWL manager 146 may end the global wear leveling operation.

When all the effective superblocks have not been swapped ("NO" in operation S612), the GWL manager 146 may repeatedly perform the global wear leveling operation from operation S604. In short, when none of the conditions of S608, S610, and S612 are satisfied, the GWL manager 146 may repeatedly perform the global wear leveling operation, and when any one of the conditions of S608, S610, and S612 is satisfied, the GWL manager 146 may end the global wear leveling operation.

Figure 7:
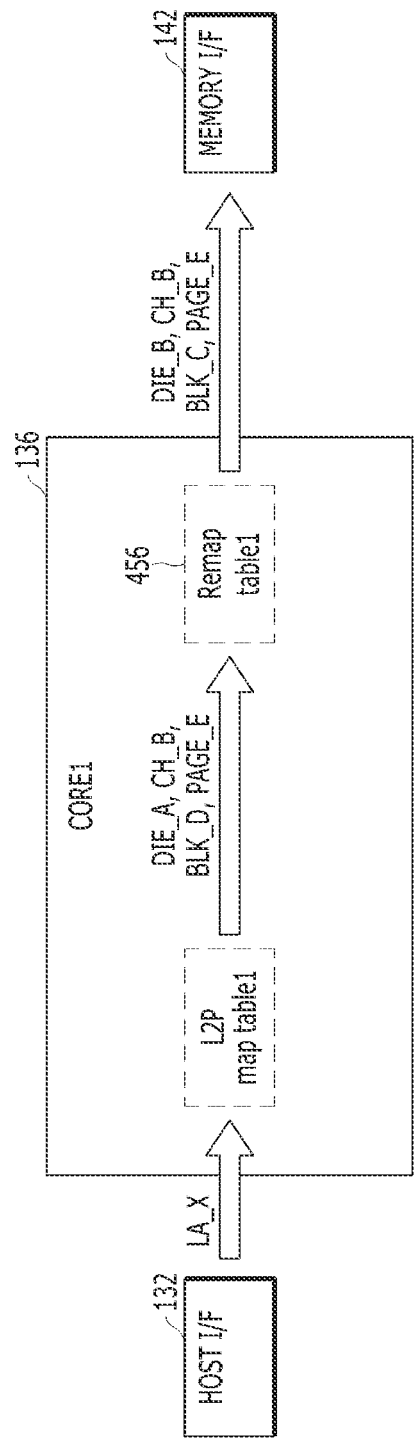
FIG. 7 is a diagram for describing a method in which the first core accesses a superblock swapped by a global wear leveling operation in accordance with an embodiment of the present disclosure.

FIG. 7 is a diagram for describing a method in which the first core 136 accesses a superblock swapped by the global wear leveling operation in accordance with an embodiment of the present disclosure. Hereinafter, a method of accessing the swapped superblock will be described using the first core 136 as an example; however, a method in which the second core 138 accesses the swapped superblock may be substantially the same.

FIG. 7 illustrates the host I/F 132, the first core 136, and the memory I/F 142 described with reference to FIG. 1 to FIG. 4, FIG. 5A, FIG. 5B, and FIG. 6.

The host I/F 132 may provide the first core 136 with an odd address command from the host 102. In FIG. 7, a logical address of the command provided to the first core 136 is indicated by LA_X.

The first core 136 may translate the logical address LA_X into a physical address by referring to the first L2P map table stored in the memory 144. In the example of FIG. 7, the translated physical address may include a memory die identifier DIE_A, a channel identifier a memory block identifier BLK_D, and a page identifier PAGE_E.

The first core 136 may determine whether the translated physical address is an address indicating a swapped memory block by referring to the first remap table 456 stored in the memory 144. For example, the first core 136 may determine whether the original memory blocks of the first remap table 456 include a memory block with the same memory die identifier, channel identifier, and block identifier as those of the translated physical address.

When the translated physical address is not the address indicating the swapped memory block, the first core 136 may provide the translated physical address to the memory I/F 142. The memory I/F 142 may access a page of the memory block indicated by the translated physical address.

When the translated physical address is the address indicating the swapped memory block, the first core 136 may retranslate the translated physical address into a corresponding physical address of a memory bock by referring to the first remap table 456. In the example of FIG. 7, the retranslated physical address may include a memory die identifier DIE_B, the channel identifier CH_B, a memory block identifier BLK_C, and the page identifier PAGE_E. In accordance with an embodiment of the present disclosure, since memory blocks connected to the same channel among the first and second memory blocks are swapped by the global wear leveling operation, the channel identifiers of the translated physical address and the retranslated physical address may be the same.

The first core 136 may provide the retranslated physical address to the memory I/F 142. The memory I/F 142 may access a page of a memory block indicated by the retranslated physical address.

In accordance with an embodiment of the present disclosure, the memory system 110 may include the controller 130 and the plurality of channels CH_A to CH_D that connect a plurality of memory devices. Each of the channels CH_A to CH_D may be connected to the first memory blocks allocated to the first core 136 and the second memory blocks allocated to the second core 138. The GWL manager 146 may perform the global wear leveling operation by swapping the first memory block and the second memory block, which are connected to the same channel, between the first core 136 and the second core 138 on the basis of a difference between wear levels of the first and second memory blocks.

In accordance with an embodiment of the present disclosure, it is possible to equalize the wear levels of the first and second memory blocks independently accessed by different cores. When the wear levels of the first and second memory blocks are equalized, it is possible to normally use the memory system 110 until both the first and second memory blocks reach their end of life, so that it is possible to extend the life of the memory system 110.

The present disclosure described above is not limited by the aforementioned embodiments and the accompanying drawings, and those skilled in the art in light of the present disclosure will recognize that various substitutions, modifications, and changes can be made without departing from the technical spirit of the present disclosure as defined in the following claims.

What is claimed is:
1. A memory system comprising:
a controller including first and second cores;

a plurality of channels connected to the controller;
a plurality of first memory devices each including first memory blocks allocated to the first core, each of the plurality of channels being coupled to at least one first memory device; and
a plurality of second memory devices each including second memory blocks allocated to the second core, each of the plurality of channels being coupled to at least one second memory device,
wherein the controller further includes a global wear leveling manager configured to perform a global wear leveling operation by swapping a first memory block and a second memory block, which are connected to the same channel among the first memory blocks and the second memory blocks, between the first and second cores on the basis of wear levels of the first memory blocks and the second memory blocks.

2. The memory system of claim 1,
wherein the first core accesses the first memory blocks in parallel by configuring first superblocks with the first memory blocks respectively connected to the plurality of channels,
wherein the second core accesses the second memory blocks in parallel by configuring second superblocks with the second memory blocks respectively connected to the plurality of channels, and
wherein the global wear leveling manager performs the global wear leveling operation on a channel by channel basis in order to swap the first and second superblocks between the first and second cores.

3. The memory system of claim 2, wherein the global wear leveling manager starts the global wear leveling operation when a difference between a first average wear level of the first memory blocks and a second average wear level of the second memory blocks exceeds a first threshold value.

4. The memory system of claim 3, wherein, when the first average wear level is higher than the second average wear level, the global wear leveling manager performs the global wear leveling operation by swapping a first free block, which is a free block with the lowest wear level among the first memory blocks, and a second free block which is a free block with the highest wear level among the second memory blocks.

5. The memory system of claim 3,
wherein the first and second cores are further configured to determine the wear levels of the first memory blocks and the second memory blocks by performing erase counts of the first superblocks and the second superblocks, respectively, and
wherein the global wear leveling manager performs the global wear leveling operation by further swapping first memory blocks included in a free superblock with the lowest wear level among the first superblocks and second memory blocks included in a free superblock with the highest wear level among the second superblocks, on the channel by channel basis.

6. The memory system of claim 4, wherein the global wear leveling manager performs the global wear leveling operation by swapping information on the wear levels of the first and second free blocks, and updates the first and second average wear levels.

7. The memory system of claim 6, wherein the global wear leveling manager repeatedly performs the global wear leveling operation until the difference between the first average wear level of the first memory blocks and the second average wear level of the second memory blocks is less than a second threshold value.

8. The memory system of claim 6, wherein the global wear leveling manager repeatedly performs the global wear leveling operation until first free blocks included in the first memory blocks or second free blocks included in the second memory blocks are all swapped.

9. The memory system of claim 6, wherein the global wear leveling manager repeatedly performs the global wear leveling operation until effective free blocks that reduce the difference between the first and second average wear levels among the first and second memory blocks are all swapped.

10. The memory system of claim 1,
wherein the first core performs a local wear leveling operation on the first memory devices, and
wherein the second core performs a local wear leveling operation on the second memory devices.

11. The memory system of claim 1,
wherein the first core controls the first memory devices to store data associated with first logical addresses, and
wherein the second core controls the second memory devices to store data associated with second logical addresses.

12. The memory system of claim 11, further comprising a host interface configured to classify logical addresses associated with commands from a host into the first logical addresses and the second logical addresses on the basis of a result of a hash function operation on the logical addresses, to provide the first core with a command associated with the first logical address, and to provide the second core with a command associated with the second logical address.

13. The memory system of claim 12, wherein the first core is further configured to:
store a remap table, which includes information on physical addresses of swapped first memory blocks and swapped second memory blocks in a memory included in the controller,
translate the first logical address into a physical address of the first memory block by referring to a logical to physical (L2P) map table,
retranslate the translated physical address of the first memory block into a corresponding physical address of the second memory block when the translated physical address of the first memory block is included in the remap table, and
access the second memory device on the basis of the retranslated physical address of the second memory block.

14. An operation method of a memory system including a controller having first and second cores, a plurality of channels connected to the controller, and a plurality of memory blocks connected to each of the plurality of channels, the operation method comprising:
allocating first memory blocks of the plurality of memory blocks to the first core;
allocating second memory blocks of the plurality of memory blocks to the second core; and
performing a global wear leveling operation by swapping a first memory block and a second memory block, which are connected to the same channel among the first memory blocks and the second memory blocks, between the first and second cores on the basis of wear levels of the first memory blocks and the second memory blocks.

15. The operation method of claim 14,
further comprising:
accessing the first memory blocks in parallel by configuring first superblocks with the first memory blocks respectively connected to the plurality of channels; and accessing the second memory blocks in parallel by configuring second superblocks with the second memory blocks respectively connected to the plurality of channels, wherein the global wear leveling operation is performed on a channel by channel basis in order to swap the first and second superblocks between the first and second cores.

16. The operation method of claim 15, wherein the performing of the global wear leveling operation includes swapping a first free block, which is a free block with the lowest wear level among the first memory blocks, and a second free block, which is a free block with the highest wear level among the second memory blocks, when the first average wear level is greater than the second average wear level.

17. The operation method of claim 16, wherein the performing of the global wear leveling operation further includes swapping information on the wear levels of the first free blocks and the second free blocks; and updating the first and second average wear levels.

18. The operation method of claim 14, further comprising:

providing the first core with a command associated with a first logical address;

storing a remap table, which includes information on physical addresses of swapped first memory blocks and swapped second memory blocks in a memory included in the controller;

translating the first logical address into a physical address of the first memory block by referring to a logical to physical (L2P) map table;

retranslating the translated physical address of the first memory block into a corresponding physical address of the second memory block when the translated physical address the first memory block is included in the remap table; and accessing the second memory device on the basis of the retranslated physical address the second memory block.

19. A memory system comprising:

first memory blocks coupled to respective channels;

second memory blocks coupled to the respective channels;

a manager suitable for generating a remap table having mapping information between a selected first memory block among the first memory blocks and a selected second memory block among the second memory blocks, the selected first memory block and second memory block sharing one channel among the channels; and a core suitable for accessing the first memory blocks through the respective channels based on an address table having address information of the first memory blocks and suitable for accessing the selected second memory block through the shared channel based on the address table and the remap table.

20. The memory system of claim 19, wherein the manager is further suitable for selecting the first memory blocks and the second memory blocks for the remap table when a difference between an average wear level of the first memory blocks and an average wear level of the second memory blocks becomes greater than a threshold.

* * * * *

UNITED STATES PATENT AND TRADEMARK OFFICE
CERTIFICATE OF CORRECTION

| | | |
|---|---|---|
| PATENT NO. | : 11,409,444 B2 | Page 1 of 1 |
| APPLICATION NO. | : 17/198695 | |
| DATED | : August 9, 2022 | |
| INVENTOR(S) | : Ju Hyun Kim | |

It is certified that error appears in the above-identified patent and that said Letters Patent is hereby corrected as shown below:

On the Title Page

Please correct item (45) by removing the symbol ( * )

In addition, please correct the "( * ) Notice:" by removing the following statement from the Notice:
[[ This patent is subject to a terminal disclaimer. ]]

Signed and Sealed this
Third Day of January, 2023

*Katherine Kelly Vidal*

Katherine Kelly Vidal
*Director of the United States Patent and Trademark Office*